No. 675,460.  
J. A. YUNCK.  
PROCESS OF MANUFACTURING WHITE LEAD BY ELECTROLYSIS.  
(Application filed Feb. 25, 1899.)  
Patented June 4, 1901.  
(No Model.)
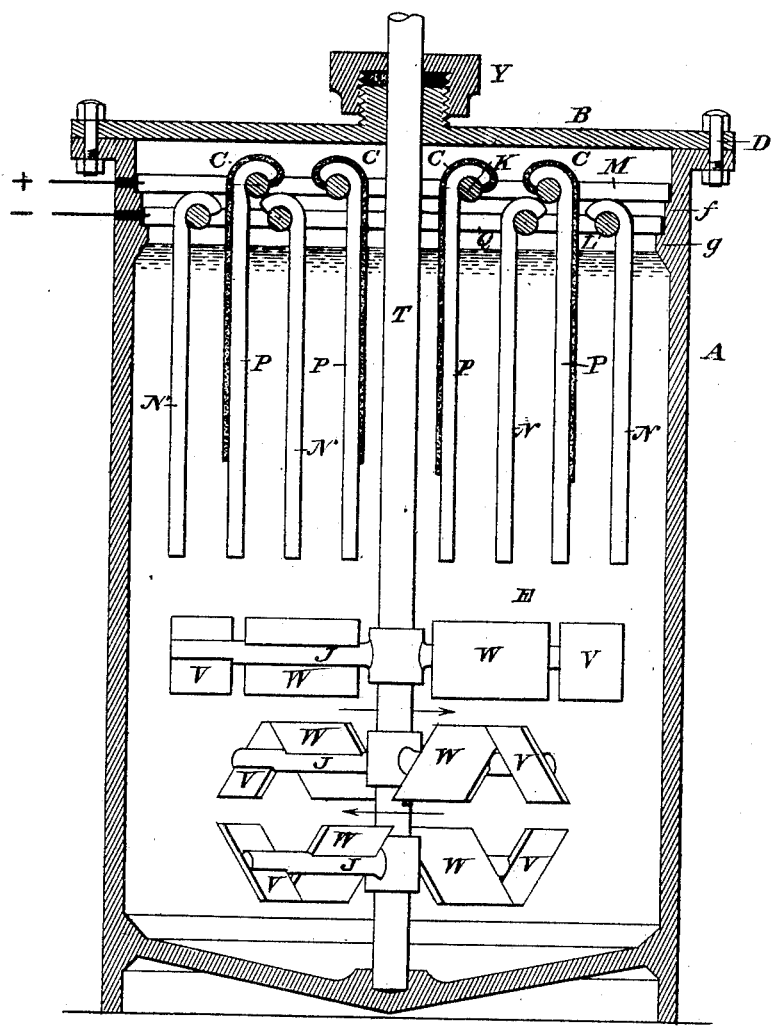
WITNESSES:  
Charles H. Houghton  
P. B. Sloat
INVENTOR:  
JOHN A. YUNCK,  
BY Franklin Scott, ATTORNEY.

UNITED STATES PATENT OFFICE.

JOHN A. YUNCK, OF HOOSICK, NEW YORK, ASSIGNOR TO LE GRAND C. TIBBITS, OF SAME PLACE.

PROCESS OF MANUFACTURING WHITE LEAD BY ELECTROLYSIS.

SPECIFICATION forming part of Letters Patent No. 675,460, dated June 4, 1901.

Application filed February 25, 1899. Serial No. 706,867. (No specimens.)

*To all whom it may concern:*

Be it known that I, JOHN A. YUNCK, a citizen of the United States of America, and a resident of the town of Hoosick, in the county of Rensselaer and State of New York, have invented certain new and useful Improvements in Processes of Manufacturing White Lead by Electrolysis, of which the following is a specification.

This invention has for its object to produce by electrolysis a commercial white lead that shall have all the desirable qualities of white lead produced by the old Dutch process. The two methods are analogous in these particulars—that the result in both cases is effected by concurrently and continuously producing hydroxid of lead along with a supply of carbon dioxid.

In carrying out the process of the invention all of the elements necessary to be acted on to secure the desired results are brought together either in the electrodes or are carried in solution in the electrolyte, so that when the electric current is turned on the several chemical reactions involved in the production of hydroxid of lead and the evolution of a proper supply of carbon dioxid to convert the hydroxid into a hydrated carbonate of lead and to regenerate the electrolyte shall concomitantly and automatically proceed until the lead of the anode shall have been completely decomposed, and this by the agency of a single current of electricity and without furnishing the bath or any of the other of the agencies involved with any supply of material from outside sources, the several reactions above enumerated proceeding automatically and continuously under the influence of the current alone until the lead of the anode shall have been exhausted. Thus the white lead is produced by a single reaction, and in this respect the process differs from those in which the results of the several reactions are separately or independently treated and from those in which it is necessary to supply material to regenerate the electrolyte or to furnish the requisite carbon dioxid from outside sources.

Any of the well-known forms of electrolytic apparatus may be readily adapted to carry out my invention.

The accompanying drawing shows a tank suitably equipped to illustrate the means required to work my improved process.

A vessel A of proper size and proportions to hold the electrolyte is provided, having appliances for attaching a cover B, so as to make a tight fit. Within this tank the electrodes are suspended from grids M and Q, which are carried on ledges *f* and *g* on the walls of the tank. These are flat plates of lead provided with hooks, by means of which they may be hung from the bars of the grids. The anodes P are hung from the bars of the grid M and the cathodes from the bars of the grid Q. The anodes are equipped with a carbon (shown at C) which connects the positive wire with the electrolyte. The electrodes are connected with the poles of the generator in any of the usual ways. The tank shown is provided with a rotary agitator T J W V, whose action promotes thorough diffusion of all the elements of the electrolyte and acts to prevent or retard polarization of the anodes during the process.

In carrying out this process a lead anode is employed and preferably a lead cathode, although a lead cathode is not indispensable. In connection with the lead anode I employ a supplemental anode which forms a connection between the positive pole and the electrolyte parallel with the connection made by the lead anode. The object and function of this supplemental electrical independent connection between the dynamo or battery and the bath is to carry to the electrolyte a full and unimpaired current while the lead anode is being decomposed, and especially after it has become so far disintegrated as to offer serious resistance to the transmission of an effective current or one which will effectually accomplish the reactions in the electrolyte essential to maintain its automatic regeneration. This supplemental anode connection should be a good conductor and of a material not affected by the electrochemical action of the process. For this purpose carbon forms a very suitable material, as it is insoluble in the electrolyte and is a good conductor. Therefore for the purposes of my invention I have adopted it, although possibly other substances would answer equally well and would form recognized substitutes for carbon. Thus it will be seen that the positive current enters the bath over a line which diverges into two forks, both of which are immersed in the electrolyte, the insoluble fork being capable of transmitting at all times a substantially unimpaired current.

For an electrolyte I prefer to use about a ten-per-cent. Baumé solution of sodium or ammonium nitrate, to which is added about one ounce of oxalic acid or oxalate of sodium or potassium to each gallon of solution; but for this purpose I do not confine myself to oxalic acid or any of the oxalates, as equivalent results may be obtained from formates and valerates, all of which for the purposes for which the oxalic acid or the oxalates are used are chemical equivalents; but for illustration and preferably I use the above. On applying the current the lead will be dissolved at the anode and precipitated as white lead by the combined action of the hydroxid from the cathode and the carbonic acid derived from the decomposition by the current of the oxalic acid present. The hydrated carbonate so produced may be removed from the tank or vessel where made and after washing and drying becomes an article of great purity and commercial value.

During the operation of the process here described the electrolyte should be so stirred or agitated as to secure as nearly as possible complete diffusion of all the ingredients of the bath. This is to prevent stagnation of the electrolyte and consequent inefficiency thereof and also to prevent polarization of the electrodes. For this purpose the agitator shown in my pending application, Serial No. 699,427, filed December 16, 1898, for "Manufacture of pigments from metallic basis by electrolysis," is well adapted.

Hence I claim as my invention, and desire to secure by Letters Patent, the following:

1. An improved process for making commercial white lead, consisting in passing an electric current through an anode of lead combined with a supplemental anode of a non-soluble conducting material, an alkaline electrolyte containing in solution a substance capable of yielding carbon dioxid, and a non-soluble cathode.

2. An improved process for making commercial white lead, consisting in passing an electric current through an anode of lead combined with a supplemental anode of a non-soluble conducting material, an alkaline electrolyte containing oxalic acid or an oxalate in solution, and a non-soluble cathode.

3. An improved process for making commercial white lead, consisting in passing an electric current through an anode of lead combined with a supplemental anode of carbon, an alkaline electrolyte containing in solution a substance capable of yielding carbon dioxid, and a non-soluble cathode.

4. An improved process for making commercial white lead, consisting in passing an electric current through an anode of lead combined with a supplemental anode of carbon, an alkaline electrolyte containing in solution oxalic acid or an oxalate, and a non-soluble cathode.

Signed by me at North Bennington, Vermont, this 16th day of February, 1899.

JNO. A. YUNCK.

Witnesses:
A. S. HATHAWAY,
FRANKLIN SCOTT.